United States Patent [19]

Means et al.

[11] Patent Number: 5,135,656
[45] Date of Patent: * Aug. 4, 1992

[54] PROCESS FOR REMOVING WATER SOLUBLE ORGANIC COMPOUNDS FROM PRODUCED WATER

[75] Inventors: C. Mitchell Means, Richmond, Tex.; Michael L. Braden, Napierville, Ill.

[73] Assignee: Nalco Chemical Company, Naperville, Ill.

[*] Notice: The portion of the term of this patent subsequent to Apr. 14, 2009 has been disclaimed.

[21] Appl. No.: 552,241

[22] Filed: Jul. 13, 1990

Related U.S. Application Data

[63] Continuation-in-part of Ser. No. 451,219, Dec. 15, 1989.

[51] Int. Cl.$^5$ .............................................. C02F 9/00
[52] U.S. Cl. ................................. 210/650; 210/662; 210/664; 210/669; 210/674; 210/692
[58] Field of Search .................... 210/662–664, 210/669, 671, 674, 677, 692, 693, 340, 341, 650

[56] References Cited

U.S. PATENT DOCUMENTS

| | | | |
|---|---|---|---|
| 3,520,896 | 7/1970 | Haigh | 210/40 |
| 3,531,463 | 9/1970 | Gustafson | 210/692 |
| 3,536,613 | 10/1970 | Kunin et al. | 210/26 |
| 3,568,833 | 3/1971 | Ritzen | 210/340 |
| 3,686,827 | 8/1972 | Haigh | 55/74 |
| 3,750,688 | 8/1973 | Hall et al. | 137/2 |
| 3,881,295 | 5/1975 | Derby | 53/21 R |

(List continued on next page.)

FOREIGN PATENT DOCUMENTS

| | | |
|---|---|---|
| 824966 | 10/1969 | Canada . |
| 1103170 | 3/1979 | Canada . |
| 49782 | 4/1982 | European Pat. Off. . |
| 2336029 | 1/1975 | Fed. Rep. of Germany . |
| 2606120 | 7/1976 | Fed. Rep. of Germany . |
| 2820771 | 11/1979 | Fed. Rep. of Germany . |
| 2847714 | 5/1980 | Fed. Rep. of Germany . |

(List continued on next page.)

OTHER PUBLICATIONS

Gabrielides; "Estimates of Oil Concentrations in Aegean Waters"; 19.
Velapoldi; "The Spectrofluorometric Determination of Polycyclic Aromatic Hydrocarbons and Aqueous Waste from Generator Columns"; 1983.
"Standard Methods for the Examination of Water and Wastewater".
Lohasz; "Measurement of the Total Oil Content of Natural Waters"; 1973.
Kasa; "Identification of Mineral Oils by Synchronous Excitation Fluoroescence Spectroscopy"; 1984.

(List continued on next page.)

Primary Examiner—Ivars Cintins
Attorney, Agent, or Firm—Arnold, White & Durkee

[57] ABSTRACT

A process for the removal of water soluble organic compounds from produced water is provided. The process allows for the removal of water soluble organic compounds by passing the produced water through a column of adsorbing resin which is capable of removing the soluble organic compounds from the water and providing an environmentally acceptable effluent. The removal of polllutants from the produced water is monitored continuously by a fluorescence detector. The process further allows for the generation of the adsorbing resin by regenerating the resin with a solvent capable of eluting accumulated soluble organic compounds from the column followed by treatment of the resin with steam to remove residual eluting solvent. The process further allows for the treatment of the eluting solvent and soluble organic compound admixture in a manner to allow reuse of the solvent and to allow recovery of the soluble organic compound or to allow direct injection of the soluble organic compound admixture into the oil stream. Thus, the invention provides a process for removal and recovery of water soluble organic compounds from produced water which creates no environmentally hazardous waste streams.

24 Claims, 1 Drawing Sheet

U.S. PATENT DOCUMENTS

| | | | |
|---|---|---|---|
| 3,979,287 | 9/1976 | Vulliez-Sermit | 208/263 |
| 3,999,653 | 12/1976 | Haigh | 206/584 |
| 4,752,399 | 6/1988 | Viator et al. | 210/704 |
| 4,765,923 | 8/1988 | Walterick, Jr. | 252/181 |
| 4,775,475 | 10/1988 | Johnson | 210/634 |
| 4,775,634 | 10/1988 | Sienkiewicz | 436/146 |
| 4,781,809 | 11/1988 | Falcone, Jr. | 204/182.4 |
| 4,792,403 | 12/1988 | Togo et al. | 210/692 |
| 4,801,386 | 1/1989 | Sugimori | 210/680 |
| 4,802,985 | 2/1989 | Sugimori | 210/502.1 |
| 4,839,054 | 6/1989 | Ruebush et al. | 210/639 |
| 4,988,737 | 1/1991 | Matthews et al. | 521/26 |
| 4,057,721 | 11/1977 | deVial et al. | 250/301 |
| 4,067,854 | 1/1978 | Florentino | 260/57 R |
| 4,125,550 | 11/1978 | Schoenenberger | 260/428 |
| 4,172,031 | 10/1979 | Hall et al. | 210/36 |
| 4,218,224 | 8/1980 | Sun | 55/20 |
| 4,224,415 | 9/1980 | Meitzner et al. | 521/38 |
| 4,297,220 | 10/1981 | Meitzner et al. | 210/690 |
| 4,514,504 | 4/1985 | Rothman | 436/85 |
| 4,676,908 | 6/1987 | Ciepiela et al. | 210/677 |
| 4,696,742 | 9/1987 | Schimazaki | 210/287 |
| 4,717,483 | 1/1988 | Bush et al. | 210/681 |

FOREIGN PATENT DOCUMENTS

| | | |
|---|---|---|
| 2936839 | 4/1981 | Fed. Rep. of Germany . |
| 3124388 | 2/1983 | Fed. Rep. of Germany . |
| 3219036 | 11/1983 | Fed. Rep. of Germany . |
| 3623052 | 1/1987 | Fed. Rep. of Germany . |
| 1560894 | 3/1969 | France . |
| 52-000792 | 1/1977 | Japan . |
| 54-047886 | 4/1979 | Japan . |
| 55-004263 | 1/1980 | Japan . |

OTHER PUBLICATIONS

Kasa; "Spectrofluorometric Study of Petroleum Fractions and Crudes of Different Orgin—A Method for Determination of Petroleum in Service Water"; 1977.

Hayes; "Paraffins, Olefins, Napthenes, and Aromatics Analysis of Selected Hydrocarbon Distillates Using On-Line Column Switching, High Performance Liquid Chromatography with Dielectric Constant Detection"; 1988.

John; "Fluorescence Cell Design and Use to Determine Crude Oil and Water"; 1982.

Hornig; "Development of an Oil and Water Content Monitor"; 1977.

Minarik; "Use of Fluorescence Spectrophotometry for Analyzing Petroleum Products in Water"; 1978.

Hornig; "Ship Board and Water Content Monitoring Based on Oil Fluorescence"; 1976.

Cabaniss; "Synchronous Fluorescence Spectra of Natural Waters Tracing Sources of Dissolved Organic Matter"; 1987.

Bari; "Measurement of Waste Water Treatment Efficiency by Fluorescence and U.V. Absorbance"; 1985.

Soerstroem, "A Note on In-Site Fluorescence for Detection of Oil and Water"; 1985.

Maher; "Use of Fluorescence Spectroscopy for Monitoring Petroleum Hydrocarbon Contamination in Estuarine and Ocean Waters"; 1983.

Strek, et al.; "Adsorbent Regeneration in Oil Adsorption of Hydrocarbons".

El-Rifai; "Steam Regeneration of a Solvent's Adsorber"; 1973.

Coursin; "Effluent Monitoring for Oil and Water"; 1988.

Sinel-Nikov; "Determination of Organic Compound Levels in Natural Waters Using Visible and U.V. Fluorescence Spectra"; 1987.

Reznikov, et al.; "Methods of Analysis of Natural Waters".

Krivitskaya; "Turbidimetric-Chromatographic Determination of Petroleum Pollution in Water".

Poinescu; "On the Structure of Macroreticular Styrene-Divinylbenzene Copolymers"; 1988.

Rohm & Haas; "Decolorization of Kraft Pulp Bleaching Effluents Using Amberlite XAD-8 Polymeric Adsorbent"; pp. 3, 6, and 9.

Rohm & Haas; "Amberlite XAD-4 Resin"; pp. 5, and 8.

Rohm & Haas; "Amberlite XAD-2"; pp. 5, 8, and 9.

Rohm & Haas; "Amberlite XAS-7"; pp. 5, and 8.

PROCESS FOR REMOVING WATER SOLUBLE ORGANIC COMPOUNDS FROM PRODUCED WATER

This application is a continuation-in-part of previously filed U.S. patent application Ser. No. 451,219, filed Dec. 15, 1989.

BACKGROUND OF THE INVENTION

1. Field of the Invention

The present invention relates to a process for the removal of water soluble organic compounds from water. The invention further relates to a process for the removal of water soluble organic compounds associated with the production of crude oil. The invention further relates to a means of recovery of the soluble organic compounds present in produced water.

2. Description of the Related Art

In the process of crude oil production from subterranean formations, a substantial amount of water may be produced. Such oil-associated water (produced water) contains contaminating compounds which must be removed prior to releasing the water into the environment. Of course, it is possible to use turbidometric or colorimetric procedures to test for the content of oil in such water. However, in many instances, the contamination in the water is not visible to the naked eye since many of the pollutants are water soluble and, therefore, require detection methods capable of monitoring these compounds. For example, Environmental Protection Agency regulations currently stipulate a maximum oil content of 48 parts per million (ppm) for produced water released into surface waters of the Gulf of Mexico and Pacific Ocean (*Fed. Reg.* 51, 24897, Jul. 6, 1986).

Other sources of produced water are encountered in the refining of crude oil. Plants which process oil products are increasingly limited by federal and state regulations as to the total organic content (soluble and dispersed hydrocarbons) of effluent water. Additionally, certain production facilities such as steam-generation plants, typically require large amounts of deionized water for processing. Since shortages of freshwater routinely occur in semiarid and desert regions, facilities located in these areas must provide their own source of water.

Older techniques for dealing with contaminated water involved reinjection into wells or percolation through a series of treatment ponds. These methods were unacceptable due to their high costs and environmental damage. Even so, these techniques continue to be used where no economical options exist.

More modern methods of removing oil and water soluble organics from produced water have been previously described. Canadian Patent 1,103,170 relates to the use of a macroreticular, cross-linked polymer adsorbent in columns capable of preferentially adsorbing oil. The patent further relates to the addition of pH adjusting agents coupled with a non-ionic surfactant to remove the adsorbed oil from the column. Additionally, the patent relates to the further alteration of the pH and to the final separation of the oil from the surfactant by phase separation techniques. The method taught by this patent, apart from including several intermediate steps in the purification and recovery process, has the disadvantage of requiring acidification during the processing thereby generating additional pollutants.

Two recent U.S. Pat. Nos. (4,818,410 and 4,839,054) relate to methods for removal of water soluble organics from produced water by acidification, mixing, and phase separation. Similarly to Canadian Patent 1,103,170, these methods include several intermediate steps in the purification and recovery process. Moreover, these patents relate to the use of strong acids, thereby adding pollutants to the process stream.

U.S. Pat. No. 4,775,475 relates to the removal of trace amounts of hydrocarbonaceous compounds from aqueous feedstreams by contacting the feedstream with a suitable adsorbent such as molecular sieves, amorphous silica-alumina gel, silica gel, activated carbon, activated alumina and clays. This patent relates further to the regeneration of these adsorbents by contacting with an elution solvent such as naphtha, kerosene, diesel fuel, gas oil or mixtures of these solvents. In further steps, this patent relates to the treatment of the hydrocarbonaceous compound and elution solvent admixture in the presence of hydrogen with a hydrogenation catalyst, further treatment with an aqueous scrubbing solution which preferably contains a strong base, and still further treatment by phase separation. The resulting spent aqueous scrubbing solution requires neutralization or other treatment prior to releasing into the environment.

One typical method utilized to overcome some of the adverse characteristics of the systems which generate additional pollutants is based upon activated carbon filtration. In an activated carbon system, the carbon must be routinely removed from the filter. After removal, the carbon is either regenerated outside the filter by heating to high temperatures or it is simply discarded and replaced with new material. Additional problems with activated carbon filters arise due to microbial growth on the carbon matrix itself.

More recently, a variety of improved matrices have been designed which overcome some of the limitations encountered with activated carbon, such as the macroreticular resins. Generalized procedures relating to the use of macroreticular resins are also known which are directed to the removal of organics from fluids. See, e.g., U.S. Pat. No. 4,297,220.

In all such systems, a variety of means are taken to monitor the treated produced water in order to ascertain: (1) the efficacy of the treatment procedures; and, (2) the compliance of the treatment with federal and state regulations. Typically, these methods are carried out by spot-checking the effluent treated water by a variety standard methods for examination of water such as Standard Method 5520 B (503 A—Partition-Gravimetric Method) or Standard Method 5520 C (503 B—Partition-Infrared method), see e.g., "Standard Methods for Examination of Water and Waste Water" Port City Press, Baltimore Md, pp. 5-43 to 5-44 (1989).

Again, such methods suffer from a number of disadvantages when used in treatment systems for removal of pollutants from produced water. Chlorinated hydrocarbon solvents as well as strong acids must be added to the water in order to extract the solubilized oil constituents. Furthermore, there is no convenient way in which these methods can be utilized in a continuous monitoring system in order to obviate the necessity of spot-checking filters for the breakthrough level at which point regeneration must be achieved.

Effluent monitoring of oil in water has been accomplished for industrial plant effluents using turbidometers and fluorescence meters, see, e.g. K. Coursin, "Effluent Monitoring for Oil in Water," *Pollution Engineering*

20:100-102 (1988). However, integrated systems are needed which allow environmentally safe and real-time monitoring of soluble organic concentrations in produced water regardless of salt concentrations in the water. Preferably, such systems will combine a total oil removal process with a system capable of automation which allows continuous monitoring of the efficiency of the purification.

Such improved systems should accurately monitor breakthrough of threshold levels of pollutants which indicate necessity of regeneration of the treatment means regardless of whether this breakthrough occurs as a result of discontinuous oil concentrations in the water to be treated or whether it occurs due to a treatment system failure. Such systems should not be based on time or on volume of effluent but rather they should be based on effluent oil concentration. In addition, such systems should best be automatable such that no human error or down time due to analysis is evident. These requirements are of particular concern where, such as in offshore production operations, alternative methods can dramatically increase costs, waste man-hours and enhance the probability for accidental contamination of the marine environment due to human error.

SUMMARY OF THE INVENTION

The present invention provides a process for the removal of water soluble organic compounds from produced water which does not require the additional steps of mixing and phase separation nor the introduction into the process stream of pH adjusting agents. Furthermore, the present invention provides a method which allows the in situ regeneration of the filter matrix without the need for removal or high temperature treatment. Additionally, due to the antimicrobial nature of the regenerating solvents, microbial growth on the matrix is prevented.

The invention generally relates to the removal of water soluble organic compounds by contacting the produced water with a column of adsorbing resin which is capable of removing the soluble organic compounds from the water and providing an environmentally acceptable effluent. By combination of the purification process with a continuous fluorescence detection device, the process of the invention further allows a real-time monitoring of pollutant accumulation which is not based on arbitrary timing- or volume-based analytical methods. In so doing, the invention overcomes a substantial problem encountered with prior art methods which either risked missing breakthrough points allowing pollutant-carrying water into the environment or required intensive man-hours to adequately monitor, analyze and exchange spent filtration systems.

The invention further relates to regeneration of the adsorbing resin by contacting with a solvent capable of eluting accumulated soluble organic compounds from the column followed by treatment of the resin with steam to remove residual solvent. The invention further relates to the treatment of the eluting solvent and soluble organic compound admixture in a manner to allow reuse of the solvent or direct injection of the spent solvent into the oil stream and to allow recovery of the soluble organic compounds. Thus, the invention provides a process for removal and recovery of water soluble organic compounds from produced water which generates no environmentally hazardous waste streams.

DESCRIPTION OF THE PREFERRED EMBODIMENTS

Figure 1:
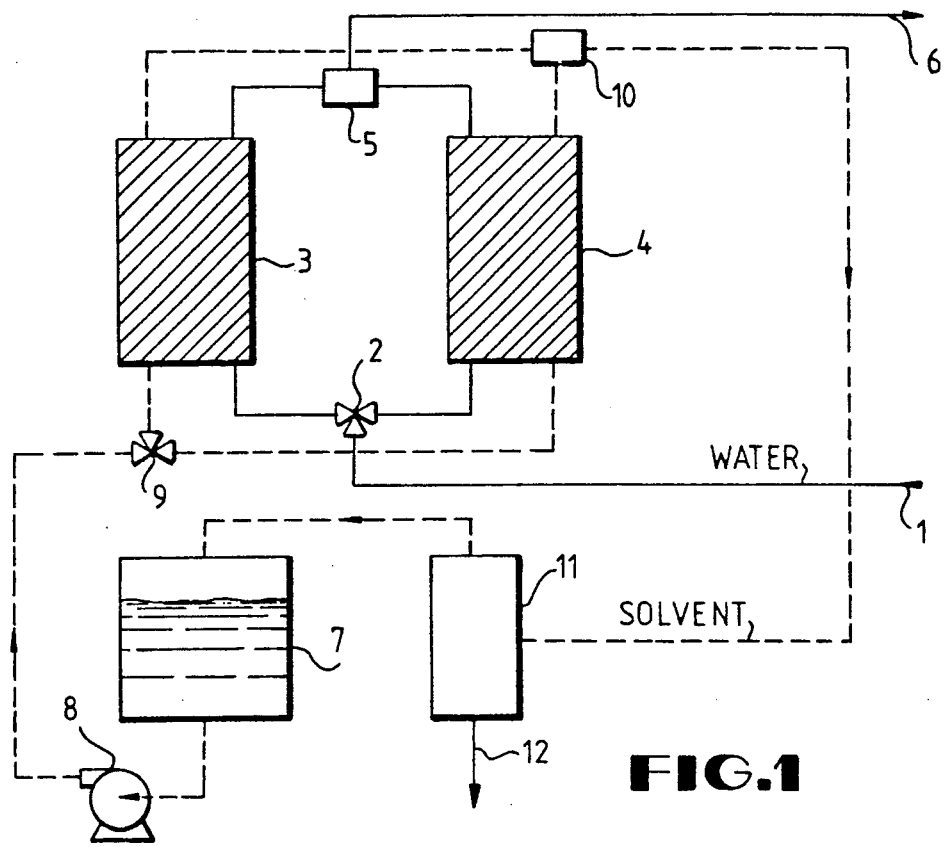
FIG. 1 is a schematic flow diagram depicting the sequence of steps provided by the process of the present invention.

The present invention provides a process for removal of water soluble organic compounds from produced water. In general, the water soluble organics are those compounds dissolved as metal salts of oxygenated hydrocarbons, alkane acids, cyclic acids and long chain organic acids. In particular, the water soluble organics include naphthenates, carboxylates, phenols, and aromatic acids typically encountered in produced water. Because of their role as a chief pollutant in produced water, naphthenic acid or any of its salts, of the general formula $R(CH_2)_nCOOH$ where R is a cyclic nucleus of one or more rings or a straight hydrocarbon chain, are of particular concern.

Produced water as used here refers to any water produced by industrial processes which generate aqueous waste streams containing contaminating trace amounts of oil and water soluble organic compounds associated with oil. A principal source of such waste water is that water produced from an oil well as a by-product of crude oil production. Another source of such waste water is that water generated as a result of an oil refining process.

In addition to the presence of water soluble organic compounds, produced water which is treatable by the process of the invention may contain dissolved hydrogen sulfide and carbonate compounds. Such additional contaminants are typically encountered in produced water from oil wells. The produced water treated by the process of the invention may also be water which has been pre-treated by deionization, softening, filtration, degasification, or by blending with an alternate water source. Produced water pre-treated by a water softening process has been found to provide enhanced results using the process of the invention.

The process of the invention further relates to the use of adsorbing resins contained within columns through which the produced water stream is directed. The adsorbing resins of the invention are those resins capable of accumulating water soluble organic compounds from the produced water stream and capable of producing an effluent with a reduced concentration of the soluble organic compounds. Adsorbing resins of particular utility for the purposes of the invention are those which are nonionogenic, macroreticular adsorption resins.

In a preferred embodiment, a macroreticular, nonionogenic resin will be used which is constructed of the polymer polystyrene cross-linked with divinylbenzene. The most preferred such resin is the XAD-16 resin of the Rohm and Haas Company (Rohm 15 and Haas Co., Independence Mall West, Philadelphia, Penna. 19105). Methods for making and using such resins are detailed in U.S. Pat. No. 4,297,220 and related patents.

The process of the invention provides for removal of water soluble organic compounds in a relatively few steps without the need for mixing, phase separation or chemical treatment with strong acids and bases. Initially the stream of produced water is directed into a first column which contains a bed of the adsorbing resin chosen for its ability to bind the water soluble organic compounds of interest. Having passed through the adsorbing resin bed in the first column, the resulting effluent from the first column has a substantially reduced concentration of the soluble organic compounds. The effluent may then be fed into an effluent stream for immediate release into surface water or stored for use in subsequent processes requiring purified water.

A monitoring step immediately downstream of the first column allows the determination of the water soluble organic compound concentration. This step serves a dual purpose in that it allows control and verification of the water quality for regulatory purposes. The monitoring step also serves as a method for determining when the adsorbing capacity of the adsorbing resin has been reached.

The monitoring steps of the invention whereby the concentration of water soluble organic compounds are measured can be any one of several measurements. Such measurement techniques would include but not be limited to measurement of the effluent conductivity, fluorescence, ultraviolet/visible absorption, infrared absorption, and turbidity.

In a highly preferred embodiment, the monitoring steps will be carried out using a fluorescence detector in combination with the process of the invention for removal of water soluble organic compounds. Most importantly, the fluorescence monitoring step should be capable of reproducing consistent readings which compare favorably to spot-checking methods such as those used in Standard Methods 5520 B and C.

When the adsorbing capacity of the resin in the first column has been reached, the stream of produced water is redirected so that it enters an alternate column containing the adsorbing resin. It can be appreciated from the nature of the process, that the alternate column may be only one of two such columns or it may be one of a multiplicity of such columns greater than two. The produced water stream entering the alternate column is treated as was that in the first column including a monitoring of the effluent immediately following the alternate column. In this manner, a threshold level can be determined at which the stream of produced water may be redirected into another column containing adsorbing resin with full adsorbing capacity. Thus, in a preferred embodiment, the process of the invention may be carried out in a continuous fashion. In a most preferred embodiment, the entire process of the invention is carried out continuously and automatically.

The process of the invention further provides for a regeneration step in which a column which has reached the adsorbing capacity of the resin contained therein is contacted with a solvent capable of eluting the accumulated amounts of the soluble organic compounds from the adsorbing resin, thereby regenerating the adsorbing capacity of the resin. In this manner, the column of resin is readied for subsequent reuse in purifying the stream of produced water. In a preferred embodiment of the invention, the solvent wash is accomplished by backwashing (regenerating) through the column of adsorbing resin in a direction opposite to the direction in which the produced water stream enters the column. In a highly preferred embodiment, the residual solvent left on the column of adsorbing resin will be removed by treating the resin with steam, see, e.g., El-Rifai, et al., *Chem. Eng* 269:26-28 (1973).

The solvent used to regenerate the adsorbing capacity of the adsorbing resins and to recover the water soluble organic compounds from the adsorbing resin may be any one or a mixture of common organic solvents. These solvents may include but are not limited to acetone, isopropanol, ethanol and methanol. Additionally, the solvent may contain an agent capable of removing dispersed oil from the resin such as a non-toxic, nonpolluting surfactant. Most preferably when the invention is practiced at remote drilling sites such as drilling sites offshore, the solvent would be a solvent such as methanol which is readily available at such sites due to its routine use in other processes.

In certain applications, a continuous supply of solvent may be available such that there will be no need for solvent regeneration. However, in a preferred embodiment of the invention, the process is self-contained and of limited solvent capacity. Therefore, solvent regeneration is required.

In one embodiment, an additional monitoring step is carried out on the eluting solvent in a reservoir of such solvent in order to determine the concentration of soluble organic compounds therein. At a predetermined level, the spent solvent is exchanged with a fresh solvent. The fresh solvent may be virgin solvent or it may be solvent derived from previous cycles in the process of the invention and which has been regenerated by removing soluble organics. Such monitoring step is achieved by use of a fluorescence detector in a highly preferred embodiment of the present invention. The fluorescence monitoring, in a most preferred embodiment, is continuous.

Regeneration of the solvent may be achieved by any of several methods known in the art. Such methods include but are not limited to distillation, ion exchange, and membrane filtration. In any case, regeneration of the solvent produces a recoverable quantity of the soluble organic removed from the produced water. This recovered product may be stored for use as a raw material source of these compounds or it may be delivered back into the crude oil stream thereby enhancing crude oil production.

In a preferred embodiment, the regeneration of the solvent and the recovery of the organic compounds from the solvent are carried out in a batch or continuous fashion. One such solvent regeneration process involves directing the eluting solvent in a stream through a vacuum distillation apparatus. Such a distillation apparatus is constructed in a manner as to allow the produced water (typically encountered at temperatures greater than 100° F.) to be used as a heat source for vaporizing the used solvent. Additionally, an ambient temperature water source such as seawater is used in the apparatus as a heat sink for condensing the purified solvent vapors. The condensed, purified solvent is then returned in a continuous fashion to the central process for use in eluting additional soluble organic compounds from the produced water stream. The soluble organic compounds removed from the solvent may be returned to the crude oil stream or recovered as a source of petroleum carboxylate salts.

Illustrated in FIG. 1 is a schematic flow diagram depicting the sequence of steps provided by the process of the present invention. Produced water is introduced 1 and directed 2 into one 3 or another 4 column containing an adsorbing resin. The effluent leaving the resin columns is monitored 5 and the purified effluent is released from the system 6. At the appropriate time, solvent from a reservoir 7 is pumped s and directed 9 through a column in order to regenerate the adsorbing capability of that column. Upon leaving the column, the solvent is monitored 10 and directed into a purifying and recovery system 11 from which the soluble organic compounds are recovered 12 and returned to the crude oil stream and from which the purified solvent is returned to the solvent reservoir 7.

The following examples illustrate certain aspects of the present invention, including certain preferred embodiments and should not be construed as limiting the claims of the invention. Other embodiments within the scope of the claims of the present invention will be apparent to one of ordinary skill in the art from consideration of the specification or from practice of the invention disclosed herein.

EXAMPLE 1

A fresh sample of produced water was obtained from an offshore platform in California. This sample was at production temperature (130° F.) and was found to contain 300 ppm soluble organics. This contaminated water was pumped at a flowrate of 2.7 gal/min./ft$^2$ through a filter containing 500 g of macroreticular, nonionogenic resin. The filter measured three inches in diameter by 12 inches in height. The results are shown in Table 1 where the soluble organic content (ppm) of the purified water is measured after various volumes of contaminated produced water is passed through the column.

TABLE 1

| Total Volume of Water (gal) | Soluble Organic Content (ppm) |
|---|---|
| 2.6 | 67.7 |
| 4.0 | 73.0 |
| 8.0 | 92.6 |
| 13.2 | 120.7 |

The filter was drained, backwashed (regenerated) with one gallon of isopropanol, then two gallons of tap water. Another test was performed following the above procedure, using the same produced water, except at a rate of 5.4 gal/min./ft$^2$. The results are shown in Table 2.

TABLE 2

| Total Volume of Water (gal) | Soluble Organic Content (ppm) |
|---|---|
| 2.6 | 71.4 |
| 4.0 | 82.0 |
| 8.0 | 108.5 |
| 13.2 | 148.3 |

EXAMPLE 2

Another produced water sample was obtained from an oilfield in California. This sample was determined to contain 94 ppm of soluble organics. The filter in Example 1 was used in this test. The flowrate was 2.7 gal/min./ft$^2$ at the beginning and increased to 5.4 gal/min./ft$^2$ after 10.0 gallons had passed through the filter. Results are shown in Table 3.

TABLE 3

| Total Volume of Water (gal) | Soluble Organic Content (ppm) |
|---|---|
| 4.0 | 18.3 |
| 8.0 | 21.5 |

TABLE 3-continued

| Total Volume of Water (gal) | Soluble Organic Content (ppm) |
|---|---|
| 13.2 | 38.5 |

EXAMPLE 3

Regeneration lifetime of a resin was tested in the following manner: A 50 g column of resin was prepared. The column was one inch in diameter by 12 inches tall. Two liters of a produced water sample from an offshore platform in California containing 180 ppm soluble organics was run through the column at a flowrate of 9.7 gal/min./ft$^2$. A sample of the purified water after 2000 mL total volume was found to contain 35 ppm soluble organics. The column was backwashed (regenerated) at 3–5 gal/min./ft$^2$ with 300 mL of isopropanol, followed by 2000 mL of tap water. This procedure was repeated 40 more times. The soluble organics content of the purified water after 2000 mL total volume from the last cycle was found to be 33 ppm.

EXAMPLE 4

The effect of column length was compared by running identical tests using a 3-foot and a 5-foot column, both one inch in diameter. This test used the same produced water sample as for Example 3. Both columns were run at a flowrate of 24 l gal/min./ft$^2$. Results are shown in Table 4.

TABLE 4

| Total Volume of Water (mL) | Soluble Organic Content (ppm) | |
|---|---|---|
| | 3 ft. | 5 ft. |
| 1000 | 47.0 | 21.0 |
| 2000 | 50.7 | 30.0 |
| 3000 | 59.2 | 35.3 |
| 4000 | 62.3 | 40.1 |
| 5000 | 66.1 | 53.9 |

EXAMPLE 5

Two liters of a produced water sample obtained from an offshore platform in California containing 87.3 ppm soluble organics was run through the same filter used in Example 3 at a flowrate of 9.7 gal/min./ft$^2$. Methanol (300 mL) was used to regenerate the filter in the procedure stated in Example 1. The methanol which contains the soluble organic material was allowed to evaporate at ambient temperature. The soluble organic residue was dissolved in deionized water (100 mL) and acidified to pH with concentrated hydrochloric acid. This acidified sample was extracted twice with 50 mL of freon (trichlorotrifluroethane). The freon extracts were combined and allowed to evaporate at ambient temperature. The resulting residue weighed 140 mg. Since this residue was extracted from 2000 mL of produced water, this corresponded to 70 mg/liter of soluble organics removed. This represents 80% removal/recovery of the soluble organics as naphthenic acids, since the original produced water sample contained 87.3 mg/liter soluble organics.

EXAMPLE 6

Optimization of the regeneration agent was carried out with the following solvents: acetone, methanol, isopropanol, and 5% aqueous sodium hydroxide solution. Acetone was found to be the best solvent, followed by methanol or isopropanol. Aqueous sodium hydroxide solution (5%) failed to function as an adequate regeneration solvent.

EXAMPLE 7

A produced water sample from a refinery in Alaska was found to contain 307 ppm total organic carbon. A 50 g resin column measuring one inch in diameter by 12 inches in height was used. The flowrate for this test was 9.7 gal/min./ft$^2$. Results are shown in Table 5.

TABLE 5

| Total Volume of Water (mL) | Total Organic Carbon (ppm) |
| --- | --- |
| 200 | 204 |
| 400 | 204 |
| 600 | 202 |
| 800 | 202 |
| 1000 | 228 |
| 2000 | 262 |
| 3000 | 274 |

EXAMPLE 8

A sample of produced water from a chemical plant in southeast Texas was found to contain 2000 ppb toluene and 1150 ppb naphthalene by gas chromatographic analysis. The procedure used in Example 7 was repeated and the results are shown in Table 6.

TABLE 6

| Total Volume (mL) | Toluene (ppb) | Naphthalene (ppb) |
| --- | --- | --- |
| Blank | 2000 | 1150 |
| 100 | <50 | <20 |
| 300 | <50 | <20 |
| 500 | <50 | <20 |
| 700 | <50 | <20 |
| 900 | <50 | <20 |
| 1000 | <50 | <20 |

EXAMPLE 9

A pilot sized unit which consisted of a column 8 inches in diameter and 6 feet in height and which possessed a 3 foot bed into which 1 cubic foot of XAD-16 resin was placed, was used to treat produced water from a production facility in California. The column was pretreated prior to use by first passing fresh water followed by methanol over the column, each at a rate of 3.5 gallons per minute, for 15 minutes each. The samples taken for determination of soluble organics were analyzed by hand using Standard Method 5520 C. The effluent stream was continuously monitored using the fluorescence method of the present invention over the same time period as was used for the soluble organic determinations. The fluorescence monitoring further was accomplished by comparison to the untreated water produced from the facility as a comparative blank sample.

Figure 2:
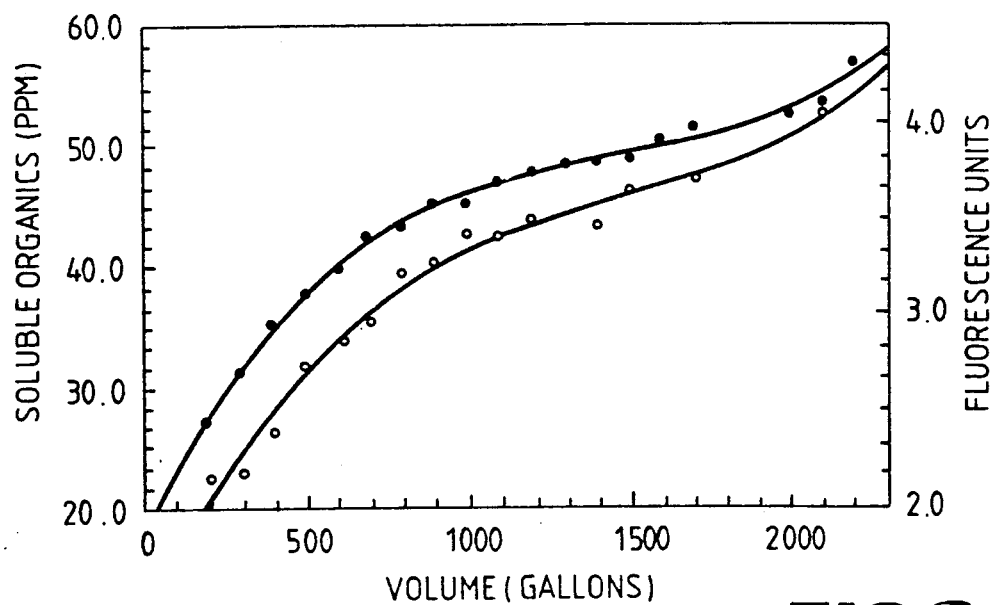
FIG. 2 is a comparison of standard methodology for determination of oil in water (soluble organics) versus fluorescence monitoring for produced water from a California production facility using the filter system of the invention in combination with the continuous fluorescence monitor.

The results of this comparative test are summarized in FIG. 2 where it can be seen that the uppermost curve (filled circles) corresponds to time points obtained using continuous monitoring with the fluorescence detector and where the lowermost curve (open circles) corresponds to time points obtained during spot-checking using the standard analysis. As can be seen in this test, fluorescence detection compares favorably with standard analytical procedures.

We claim:

1. A process for removal of water soluble organic compounds from produced water which comprises the steps of:

(a) pretreating the produced water by de-ionization, softening, filtration, or de-gasification;

(b) directing a stream of the pretreated, produced water into a first column comprising a nonionogenic, macroreticular adsorption resin capable of accumulating water soluble organic compounds from the produced water and capable of producing an effluent with a reduced concentration of water soluble organic compounds;

(c) monitoring the concentration of water soluble organic compounds in the effluent of the first column of adsorption resin where the monitoring is achieved by a fluorescence measurement which continuously monitors the effluent by continuously passing a portion of the effluent stream through a fluorescence detector capable of detecting the presence of naphthenic carboxylates in the effluent;

(d) redirecting the stream of the pretreated, produced water into an alternate column comprising a nonionogenic, macroreticular adsorption resin capable of removing the water soluble organic compounds from the produced water and capable of producing an effluent having a reduced concentration of water soluble organic compounds;

(e) monitoring the concentration of water soluble organic compounds in the effluent of the alternate column of adsorption resin where the monitoring is achieved by a fluorescence measurement which continuously monitors the effluent by continuously passing a portion of the effluent stream through a fluorescence detector capable of detecting the presence of naphthenic carboxylates in the effluent;

(f) contacting the first column of adsorption resin, which has accumulated water soluble organic compounds from the pretreated, produced water, with a solvent capable of eluting accumulated amounts of the water soluble organic compounds from the adsorption resin and capable of regenerating the adsorption resin;

(g) redirecting the stream of the pretreated, produced water into the first column of adsorption resin which has been regenerated as recited in step (f); and (h) contacting the alternate column of adsorption resin, which has accumulated water soluble organic compounds from the pretreated, produced water, with a solvent capable of eluting the accumulated amounts of water soluble organic compounds from the adsorption resin and capable of regenerating the adsorption resin.

2. The process of claim 1 where the steps are carried out continuously.

3. The process of claim 1 where a multiplicity of columns greater than two are used.

4. The process of claim 1 where the nonionogenic, macroreticular adsorption resin comprises a resin of polystyrene cross-linked with divinylbenzene.

5. The process of claim 1 where the water soluble organic compounds comprise petroleum carboxylate salts, fatty acids, phenols, thiophenols, or petroleum-derived aromatic compounds.

6. The process of claim 1 where the produced water comprises water which is removed from an oil well as a byproduct of crude oil production.

7. The process of claim 1 where the produced water comprises water which is the result of an oil refining process.

8. The process of claim 1 where the produced water comprises dissolved hydrogen sulfide and carbonates.

9. The process of claim 1 where the pre-treatment comprises blending with another water source.

10. The process of claim 1 where steps (f) and (h) are accomplished by regenerating the columns of adsorption resin with sufficient solvent to achieve approximately the full adsorption capability of the resin.

11. The process of claim 10 where regenerating the columns of adsorption resin with solvent is followed by treatment of the resin with steam to remove residual solvent.

12. The process of claim 11 where condensate is recovered from the steam treatment of the resin and added back to the eluting solvent.

13. The process of claim 1 where the eluting solvent comprises acetone, isopropanol, ethanol, or methanol.

14. The process of claim 13 where the eluting solvent comprises a wash agent capable of removing dispersed oil from the resin.

15. The process of claim 1 where an additional monitoring step is carried out on the eluting solvent to determine the concentration of water soluble organic compounds therein where the monitoring is achieved by a fluorescence measurement which continuously monitors the eluting solvent by continuously passing a portion of the eluting solvent stream through a fluorescence detector capable of detecting the presence of naphthenic carboxylates in the eluting solvent.

16. The process of claim 15 where the eluting solvent is purified by removing the water soluble organic compounds.

17. The process of claim 16 where the purification of the eluting solvent comprises distillation, ion exchange, membrane filtration, or vaporizing the eluting solvent.

18. The process of claim 17 where the purification of the eluting solvent comprising distillation further comprises directing the eluting solvent through a distillation system which distillation system comprises an incoming produced water source for heating the eluting solvent under vacuum and an ambient temperature water source for condensing the eluting solvent vapors.

19. The process of claim 16 where the purification of the eluting solvent is continuous.

20. The process of claim 16 where the organic compounds removed from the eluting solvent are recovered.

21. The process of claim 20 where the soluble organic compounds recovered from the eluting solvent are returned to an oil stream.

22. A process for removal of water soluble organic compounds from produced water removed from an oil well as a byproduct of crude oil production, which comprises the steps of:
(a) pretreating the produced water by de-ionization, softening, filtration, or de-gasification;
(b) directing a stream of the pretreated, produced oil well water into a first column containing a nonionogenic macroreticular resin capable of accumulating petroleum derived water soluble organic compounds from the water and capable of producing an effluent with a reduced concentration of petroleum derived water soluble organic compounds;
(c) monitoring the concentration of petroleum derived water soluble organic compounds in the effluent of the first column of adsorption resin by monitoring the soluble organic concentration where the monitoring is achieved by a fluorescence measurement which continuously monitors the effluent by continuously passing a portion of the effluent stream through a fluorescence detector capable of detecting the presence of naphthenic carboxylates in the effluent;
(d) redirecting the stream of the pretreated, produced oil well water into an alternate column containing a nonionogenic macroreticular resin capable of accumulating petroleum derived water soluble organic compounds from the water and capable of producing an effluent with a reduced concentration of petroleum derived water soluble organic compounds;
(e) monitoring the concentration of petroleum derived water soluble organic compounds in the effluent of the alternate column of nonionogenic macroreticular resin by monitoring the soluble organic concentration where the monitoring is achieved by a fluorescence measurement which continuously monitors the effluent by continuously passing a portion of the effluent stream through a fluorescence detector capable of detecting the presence of naphthenic carboxylates in the effluent;
(f) regenerating the first column of resin which has accumulated petroleum derived water soluble organic compounds from the pretreated, produced oil well water by treating the absorption resin with an eluting solvent;
(g) redirecting the stream of the pretreated produced oil well water into the first column of resin which has been regenerated as in step (f);
(h) regenerating the alternate column of resin which has accumulated petroleum derived water soluble organic compounds from the pretreated, produced oil well water by treating the absorption resin with an eluting solvent; and
(i) repeating steps (b) through (h) continuously.

23. A process for removal and recovery of water soluble organic compounds from water removed from an oil well as a byproduct of crude oil production, which comprises the steps of:
(a) pretreating the produced water by de-ionization, softening, filtration, or de-gasification;
(b) directing a stream of the pretreated, produced oil well water into a first column containing a nonionogenic macroreticular resin capable of accumulating petroleum derived water soluble organic compounds from the water and capable of producing an effluent with a reduced concentration of petroleum derived water soluble organic compounds;
(c) monitoring the concentration of petroleum derived water soluble organic compounds in the effluent of the first column of adsorption resin by monitoring the soluble organic concentration where the monitoring is achieved by a fluorescence measurement which continuously monitors the effluent by continuously passing a portion of the effluent stream through a fluorescence detector capable of detecting the presence of naphthenic carboxylates in the effluent;
(d) redirecting the stream of the pretreated, produced oil well water into an alternate column containing a nonionogenic macroreticular resin capable of accumulating petroleum derived water soluble organic compounds from the water and capable of producing an effluent with a reduced concentration of petroleum derived water soluble organic compounds;

(e) monitoring the concentration of petroleum derived water soluble organic compounds in the effluent of the alternate column of adsorption resin by monitoring the soluble organic concentration where the monitoring is achieved by a fluorescence measurement which continuously monitors the effluent by continuously passing a portion of the effluent stream through a fluorescence detector capable of detecting the presence of naphthenic carboxylates in the effluent;

(f) regenerating the first column of resin which has accumulated petroleum derived water soluble organic compounds from the pretreated, produced oil well water by treating the adsorption resin with an eluting solvent;

(g) redirecting the stream of the pretreated, produced oil well water into the first column of resin which has been regenerated as in step (f);

(h) regenerating the alternate column of resin which has accumulated petroleum derived water soluble organic compounds from the pretreated, produced oil well water by treating the absorption resin with an eluting solvent;

(i) purifying the eluting solvent used to regenerate the resin in steps (f) and (h) by distillation;

(j) recovering the petroleum derived water soluble organic compounds from the distillation of the eluting solvent and returning the petroleum derived soluble organic compounds to an oil stream; and (k) repeating steps (b) through (j) continuously.

24. A process for removal and recovery of water soluble organic compounds from water removed from an oil well as a byproduct of crude oil production, which comprises the steps of:

(a) pretreating the produced water by de-ionization, softening, filtration, or de-gasification;

(b) directing a stream of the pretreated, produced oil well water into a first column containing a nonionogenic macroreticular resin capable of accumulating petroleum derived water soluble organic compounds from the water and capable of producing an effluent with a reduced concentration of petroleum derived water soluble organic compounds;

(c) monitoring the concentration of petroleum derived water soluble organic compounds in the effluent of the first column of adsorption resin by monitoring the soluble organic concentration where the monitoring is achieved by a fluorescence measurement which continuously monitors the effluent by continuously passing a portion of the effluent stream through a fluorescence detector capable of detecting the presence of naphthenic carboxylates in the effluent;

(d) redirecting the stream of the pretreated, produced oil well water into an alternate column containing a nonionogenic macroreticular resin capable of accumulating petroleum derived water soluble organic compounds from the water and capable of producing an effluent with a reduced concentration of petroleum derived water soluble organic compounds;

(e) monitoring the concentration of petroleum derived water soluble organic compounds in the effluent of the alternate column of adsorption resin by monitoring the soluble organic concentration where the monitoring is achieved by a fluorescence measurement which continuously monitors the effluent by continuously passing a portion of the effluent stream through a fluorescence detector capable of detecting the presence of naphthenic carboxylates in the effluent;

(f) regenerating the first column of resin which has accumulated petroleum derived water soluble organic compounds from the pretreated, produced oil well water by treating the absorption resin with an eluting solvent, which regenerating is completed by removing residual eluting solvent using steam treatment of the resin, the condensate of which steam treatment is returned to the eluting solvent;

(g) redirecting the stream of the pretreated, produced oil well water into the first column of resin which has been regenerated as in step (f);

(h) regenerating the alternate column of resin which has accumulated petroleum derived water soluble organic compounds from the pretreated, produced oil well water by treating the absorption resin with an eluting solvent, which regenerating is completed by removing residual eluting solvent using steam treatment of the resin, the condensate of which steam treatment is returned to the eluting solvent;

(i) purifying the eluting solvent used to regenerate the resin in steps (f) and (h) by distillation;

(j) recovering the petroleum derived water soluble organic compounds from the distillation of the eluting solvent and returning the petroleum derived soluble organic compounds to an oil stream; and (k) repeating steps (b) through (j) continuously.

* * * * *